(No Model.)
A. PERLICH.
LAMP FOR PRODUCING SPIRIT GAS INCANDESCENT GAS LIGHT.
No. 570,049. Patented Oct. 27, 1896.
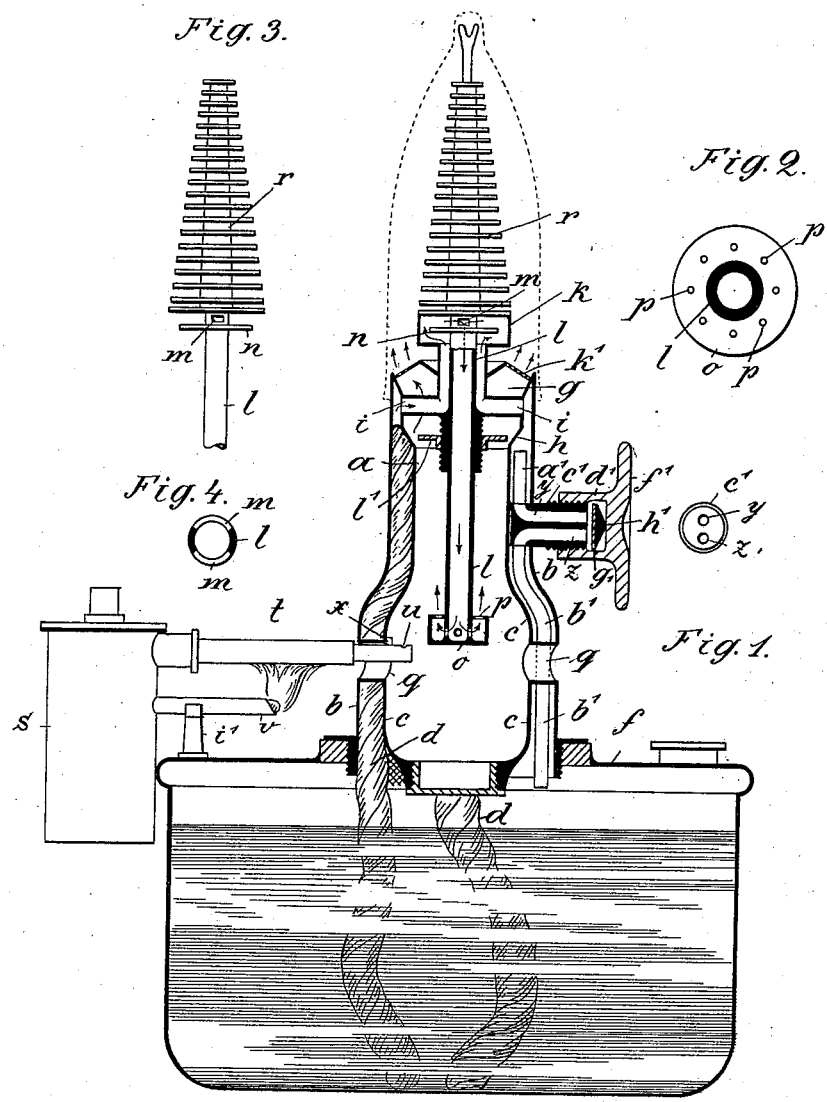
Witnesses:
Hermann Jurenz
Paul Weber
Inventor:
Albin Perlich
per Gerson & Sachs
his Attorneys

UNITED STATES PATENT OFFICE.

ALBIN PERLICH, OF DRESDEN-STRIESEN, GERMANY.

LAMP FOR PRODUCING SPIRIT-GAS INCANDESCENT GAS-LIGHT.

SPECIFICATION forming part of Letters Patent No. 570,049, dated October 27, 1896.

Application filed October 29, 1895. Serial No. 567,326. (No model.) Patented in France August 28, 1895, No. 248,141; in Luxemburg August 28, 1895, No. 2,359; in Norway August 29, 1895, No. 4,550; in Italy August 29, 1895, XXX, 39,624, LXXVII, 420; in England August 30, 1895, No. 16,272; in Belgium August 30, 1895, No. 117,205; in Hungary September 5, 1895, No. 3,577; in Switzerland September 7, 1895, No. 11,036; in Canada September 13, 1895, No. 50,741, and in Austria October 26, 1895, No. 45/4,061.

*To all whom it may concern:*

Be it known that I, ALBIN PERLICH, a subject of the Emperor of Germany, residing at Dresden-Striesen, in the Empire of Germany, have invented a new and useful Lamp for the Production of Spirit-Gas Incandescent Light, with Lighting and Extinguishing Contrivances, (for which I have obtained a patent in France, numbered 248,141 and dated August 28, 1895; in Luxemburg, numbered 2,359 and dated August 28, 1895; in Norway, numbered 4,550 and dated August 29, 1895; in Belgium, numbered 117,205 and dated August 30, 1895; in Hungary, numbered 3,577 and dated September 5, 1895; in Switzerland, numbered 11,036 and dated September 7, 1895; in Canada, numbered 50,741 and dated September 13, 1895; in Italy, numbered Reg. Gen., XXX, No. 39,624, Reg. Att., Vol. LXXVII, No. 420, and dated August 29, 1895; in Great Britain, numbered 16,272 and dated August 30, 1895; in Austria, numbered Reg. B., 45, Reg. S., 4,061, and dated October 26, 1895,) of which the following is a specification.

The purpose of this lamp is to produce gas from spirit, in order, by mixing the gas with air, to heat an incandescent body.

Figure 1 shows this spirit glow-lamp in vertical section, while Figs. 2 to 4 illustrate single parts in view and in cross-section.

The lamp consists, as Fig. 1 shows, of three principal parts, the burner, and the lighting and extinguishing contrivances. The burner is formed of a double-walled hollow cylinder $a$, between the walls $b$ and $c$ of which are a number of wicks $d$, which suck up the spirit contained in receptacle $f$. In the burner-head $g$ at the upper edge of the cylinder $a$ the inner casing $c$ has a conical widening $h$, in which two or more tubes $i$ are arranged which run into the hollow burner-disk $k$. The interior of the burner-disk $k$ is provided with a vertical tube $l$, having slits or openings $m$ at its upper end. Beneath these openings is a plate $n$. The lower end of the tube $l$ in the cylinder $a$ has a distributing-chamber $o$, which is provided with outlet-openings $p$. In the cylinder $a$, at the height of this distributing-chamber, are two or more air-channels $q$.

Upon the hollow burner-disk $k$ (shown in Figs. 1 and 3) is fastened a ribbed body $r$, which supports the incandescent mantle or other medium, and is also for the purpose of accumulating and distributing heat.

The lighting contrivance consists of a smaller spirit-receptacle $s$, on which a tube $t$ is arranged, and has a small opening $u$ at its free end and a wick in its other end, which is in the receptacle $s$. Underneath this tube $t$ there is a second tube $v$, the wick of which lies exposed at its open end for lighting. This lighting contrivance while in use is held by tube $v$, resting on feet $i'$, which stand upon the receptacle $f$, and by the tube $t$, which, with the catch $x$ at its front end, is hooked into a channel $q$.

The extinguishing arrangement is formed by two channels $y$ and $z$, which are both in the short piece $c'$, and to which channels tubes $a'$ and $b'$ are joined, tube $b'$ reaching into the receptacle $f$. The short piece $c'$ is provided on its outer end with a thread upon which a socket $d'$ can be moved backward and forward, and is closed by a non-conducting hand-plate $f'$. In the socket $d'$ is a stopper-plate $g'$, made of cork or similar material, for the purpose of reducing the friction, and carried by a metal cone $h'$.

If the lamp is to be lighted, the tube $t$ of the lighting contrivance is put into one of the channels $q$, so that the catch $x$ hooks firmly to the inside of the cylinder $a$. Then the apparatus, with its feet $i'$, is placed upon the receptacle $f$ and the wick protruding from the tube $v$ is lighted. The flame thus produced turns the spirit sucked into the wick of the tube $t$ into gas, and this escapes through the small opening $u$ into the interior of the cylinder $a$. Here, through the conical widening $h$ circulating around the tubes $i$, it reaches through the perforated surface $k'$, upon which it is lighted.

While now the lamp is burning, the upper part of the cylinder $a$ is heated by the warmth radiating from the burner-disk $k$ and the ribbed body $r$, so that gasification of the spirit sucked into the wicks $d$ takes place. The gas hereby developed now goes in the direction of the arrows through the tubes $i$ $i$ into the hollow burner-disk $k$, encompassing the plate $n$, and passes through the openings $m$ into the tube $l$. In this way the gas in the burner-disk is again heated by the flame on the perforated surface, and in this condition now arrives in the distributing-chamber $o$, passes through the opening $p$ into the interior of the cylinder $a$, goes from here into the conical widening $h$, circulates around the tubes $i$, and reaches the flame through the perforated surface $k$.

On coming out of the openings $p$ the gas mixes with the air entering through the channels $q$. When this gas reaches the burner-head, a further spontaneous gasification takes place in the wicks $d$, so that the lighting contrivance can be detached.

In order to regulate the gas streaming to the perforated surface, a plate $l'$ is provided inside of the conical widening $h$, which plate can be raised or lowered by a thread arranged on the tube $l$, whereby the intermediate space between the conical wall and the plate $n$ is extended or diminished, resulting in a greater or less influx of gas.

If the lamp is to be extinguished, the extinguishing contrivance provided on the burner already described is used.

With the burning lamp the socket $d'$ is so far screwed onto the short piece $c'$ that the channels $y$ and $z$ are closed by the stopper-plate $g'$. In this position the gas developed in the wicks $d$, distributing itself on all sides, reaches into the tube $a'$ and the channel $y$. As this is closed by the plate $g'$ all the gas therefore developed in the wicks $d$ streams through the perforated surface to the flame. If, however, by means of the hand-wheel $f''$, the socket $d'$ is turned in such way that an intermediate space is formed between the mouth of the short piece and the plate $g'$, then the gas which is in the channel $y$ passes through this intermediate space into the channel $z$ and through tube $b'$ into the receptacle $f$. By this diverting of the gas the flame on the perforated surface is extinguished.

What I claim is—

1. In a spirit-gas incandescent lamp the combination of the burner-disk $k$ with a ribbed body $r$ which holds the incandescent mantle as and for the purpose set forth.

2. In the warming device the combination of a special spirit-receptacle $s$, a tube $t$ filled with a wick and provided with small opening $u$ and catch $x$, with burner-tube $v$ beneath, by which the spirit in tube $t$ is gasified, as set forth.

3. In a spirit-gas incandescent lamp the combination of the tubes $a'$ and $b'$ with the air-tight spirit-receptacle $f$, the piece $c'$, the channels $y$ $z$ of this piece $c'$, the socket $d'$ and the cone-shaped stopper-plate $h'$ inside the socket $d'$, as and for the purpose specified.

ALBIN PERLICH.

Witnesses:
HERMANN JURENZ,
PAUL WEBER.